Figure 1:
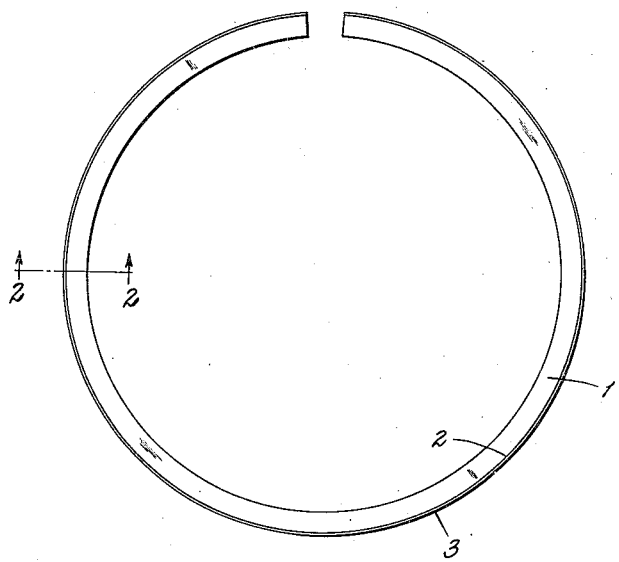

Feb. 16, 1943       C. A. MARIEN ET AL       2,311,240
COATING FOR PISTON RINGS
Filed Nov. 20, 1939

INVENTORS:
CHARLES A. MARIEN,
MELVIN W. MARIEN,
BY Harry A. Benner
ATTORNEY.

Patented Feb. 16, 1943

2,311,240

UNITED STATES PATENT OFFICE 2,311,240

COATING FOR PISTON RINGS

Charles A. Marien and Melvin W. Marien, St. Louis, Mo., assignors to Ramsey Accessories Manufacturing Corporation, St. Louis, Mo., a corporation of Missouri Application November 20, 1939, Serial No. 305,256

4 Claims. (Cl. 309—44)

Our invention has relation to improvements in coatings for piston rings and other metallic articles, designed to have rubbing contact with metallic surfaces. The invention is primarily designed for piston ring coatings and will be described in connection therewith.

The principal object of the invention is to produce a coating of ferric oxide (red oxide of iron), commonly called jeweler's rouge, on the cylinder contacting surface of the piston rings to facilitate the "wearing in" of the piston ring after it is put into operation in an engine cylinder. As is generally known, piston rings are made of cast iron or a combination of cast iron and steel, and when these cast iron rings are operated in a cylinder the walls of which are highly polished, the high spots on the ring contact with the cylinder wall with a high unit pressure and often result in injury to the cylinder wall through scoring action. If, in order to counteract this action, the surface of the piston rings is given too high a polish then the abrasive effect between the piston ring and the cylinder wall will be insufficient to produce the proper "wearing in" action and considerable time will be required before the ring will seat against the cylinder wall.

It is our further purpose to improve the seating effect of the piston rings by applying a foundation coating for the ferric oxide comprising non-metallic phosphates. This foundation coating is soft by comparison with the iron or steel of the piston ring and is comparatively porous so that it will readily receive the finely powdered ferric oxide which becomes intimately associated with it so that when the piston is put into operation in the cylinder the coating spreads out evenly over the surface of the piston, increasing the area thereof in contact with the cylinder wall and at the same time causing the fine abrasive to be effective over the entire surface of the ring, whereby a maximum polishing effect is obtained and rapid "wearing in."

When uncoated rings are used in new cylinders they may become scuffed and scored, especially if the rings are broken in under conditions of high speed, high temperature and high unit pressure. The high unit pressure is usually due to the fact that the surfaces do not mate flatly or do not have an intimate contact over the maximum possible area due to the roughness or high points on the surfaces.

If uncoated rings are used for replacement in worn, but highly polished or "glazed" cylinders, there is a possibility that the mating surfaces will not "wear in" or mate properly at all, with consequent failure of the piston rings to achieve their primary purpose which is to prevent loss of compression, prevent blow-by of combustion gases at the beginning of the power stroke and retard consumption of oil.

It is also our purpose to produce a composite coating, which is soft and which will reduce unit pressure and friction between new mating surfaces, but at the same time contains the fine polishing abrasive (jeweler's rouge) which will promote the mating of a replacement piston ring with a worn but "glazed" cylinder. The action of the fine polishing abrasive is to produce a controlled amount of wear at a decelerating rate. In other words, the fine abrasive polishing agent produces a new polished cylinder surface which is mated to the piston ring.

In producing our composite coating, the ring is first immersed in a phosphate bath so as to produce a phosphate coating on the metal surfaces. Various baths have been used for this purpose but we prefer that described in United States Patent No. 1,911,726 granted to Tanner and Lodeesen. When the piston ring is immersed in a bath containing zinc and iron phosphate the iron and steel surfaces of the ring are attacked by the acid bath, causing a supersaturation of the solution at the surface of the article, and precipitating zinc phosphate and iron phosphate out of the solution onto the article being treated in the form of an adherent phosphate coating. The new surface of the piston ring thus formed by the treatment in the bath holds the ferric oxide intimately to it. When this surface is examined under the microscope it is seen that the pores thereof are filled with the fine ferric oxide powder.

Figure 2:
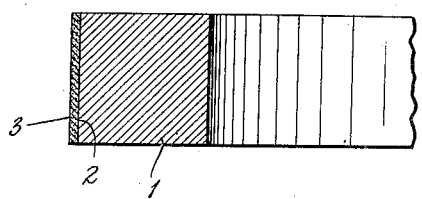

In the drawing, Figure 1 is a plan view of a piston ring embodying my improved coating; and Fig. 2 is an enlarged cross-sectional detail taken on the line 2—2 of Fig. 1.

Referring to the drawing, 1 represents a piston ring preferably made of a casting as well known in the art, the outer circumferential surface 2 of which has a layer 3 of oxide of iron coated thereon according to the herein described method.

There are numerous ways in which the ferric oxide may be applied to the surface of the piston ring. A very effective, although commercially expensive method is that of rubbing the rouge over the surface of the ring to be treated. Another method of applying the rouge is to form a colloidal mixture of the rouge with oil and water and treat the rings in the rouge bath. Other methods of applying the rouge will readily suggest themselves to the skilled metallurgist or chemist and we do not wish to be restricted to those herein specifically mentioned.

We are aware that piston rings have been coated with various materials for various purposes, but the use of a finely powdered abrasive together with a soft phosphate coating on the surface of a piston ring produces results that cannot be obtained from the various coatings heretofore devised.

Having described our invention, we claim:

1. A piston ring having a thin coating of iron and zinc phosphate and iron oxide.

2. A piston ring having an iron and zinc phosphate coating impregnated with red oxide of iron.

3. A ferrous article designed to bear upon and contact with other ferrous materials, having a thin coating of iron and zinc phosphate and iron oxide.

4. A ferrous article designed to bear upon and contact with other ferrous materials, having an iron and zinc phosphate coating impregnated with red oxide of iron.

CHARLES A. MARIEN.
MELVIN W. MARIEN.